Figure 1:
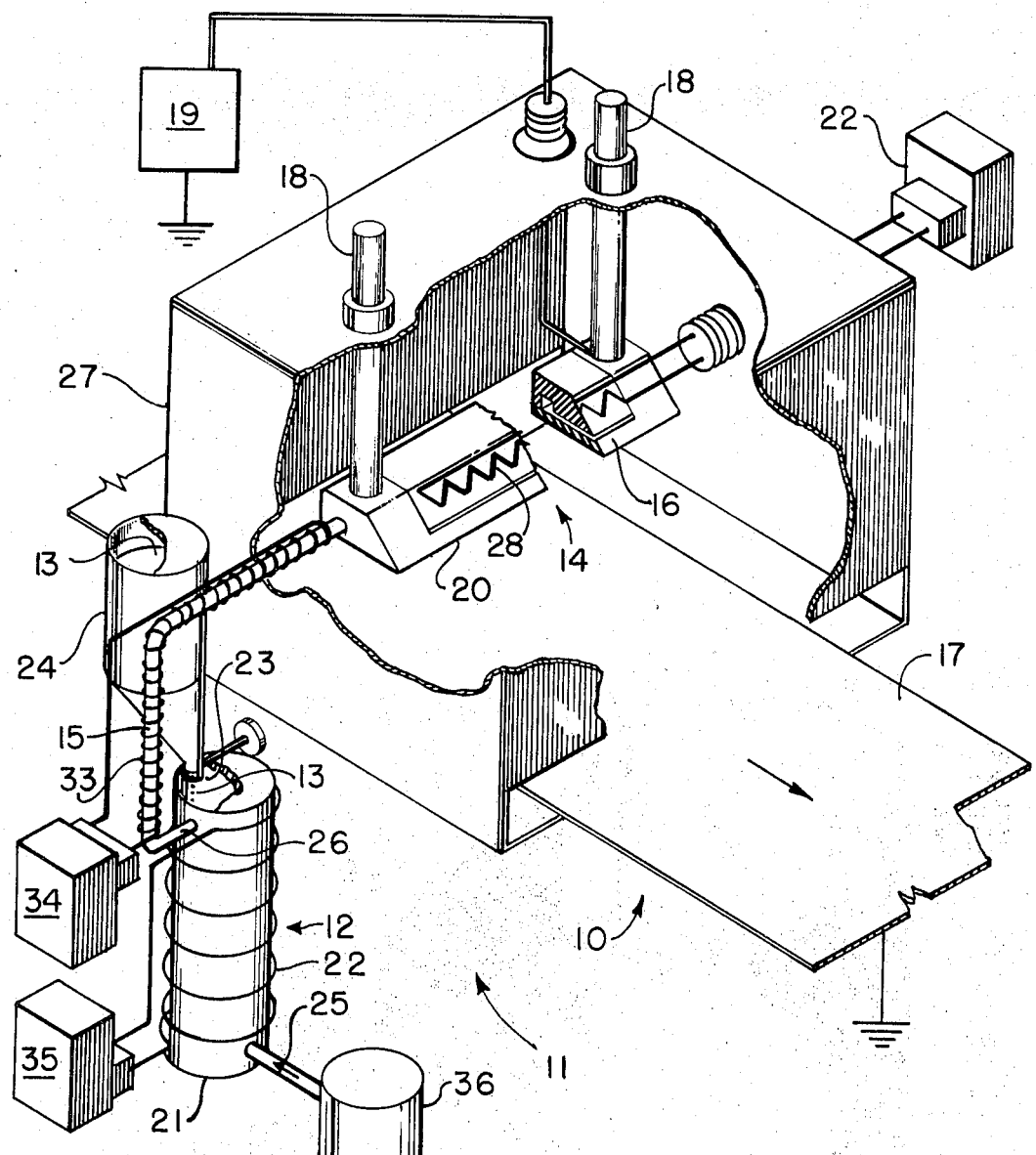

United States Patent [19]
Miller

[11] 3,776,181
[45] Dec. 4, 1973

[54] DEPOSITION APPARATUS FOR AN ORGANOMETALLIC MATERIAL
[75] Inventor: Emery P. Miller, Indianapolis, Ind.
[73] Assignee: Ransburg Electro-Coating Corp., Indianapolis, Ind.
[22] Filed: July 28, 1972
[21] Appl. No.: 276,113

Related U.S. Application Data
[62] Division of Ser. No. 7,589, Feb. 2, 1970, Pat. No. 3,699,027.

[52] U.S. Cl. ............................. 118/49.5, 118/626
[51] Int. Cl. .............................................. C23c 13/12
[58] Field of Search ............... 118/49.1, 49.5, 626, 118/627, 629; 117/93.4 R, 93.4 NC

[56] References Cited
UNITED STATES PATENTS
| 2,695,002 | 11/1954 | Miller | 317/3 X |
|---|---|---|---|
| 2,820,722 | 1/1958 | Fletcher | 117/93.4 R |
| 3,294,575 | 12/1966 | Barnes et al. | 118/49.1 X |
| 3,472,679 | 10/1969 | Ing, Jr. et al. | 118/49.5 |
| 3,473,959 | 10/1969 | Ehinger et al. | 118/49.1 X |
| 3,617,371 | 11/1971 | Burmeister, Jr. | 119/49.5 X |
| 3,693,583 | 9/1972 | Vanderschueren | 118/49.5 |
| 3,290,567 | 12/1966 | Gowen | 317/234 |
| 3,369,151 | 2/1972 | Krutenat | 117/93.4 |
| 2,939,943 | 6/1960 | Walter | 219/76 |
| 3,492,152 | 1/1970 | Cariou et al. | 117/93.4 |
| 2,651,287 | 9/1953 | Turner | 118/51 |
| 2,684,656 | 7/1954 | Ransburg | 118/51 |

Primary Examiner—Morris Kaplan
Attorney—Merrill N. Johnson et al.

[57] ABSTRACT

Means to electrostatically coat a moving substrate includes a liquid source; heated means to vaporize the liquid and to communicate the vapor to a heated, logitudinally slotted dispenser overlying and transversely coextensive with the substrate; and means to establish an electric potential between the slotted dispenser and the substrate whereby to electrostatically effect deposition of the vapor.

1 Claim, 2 Drawing Figures 3,776,181

DEPOSITION APPARATUS FOR AN ORGANOMETALLIC MATERIAL

This is a division, of application, Ser. No. 007,589, filed Feb. 2, 1970 and now U.S. Pat. No. 3,699,027.

The present invention relates to an apparatus for electrostatically charging vapors of matter such as an organometallic compound or water and causing the charged vapors of the matter to be attracted to and deposited upon a surface of a substrate.

A substrate material such as glass may have one or more of its properties such as color, strength, scratch-resistance and the like enhanced by the application thereto of a substance which possesses one or more properties which are desired to be imparted to the substrate. For example, it is known that various properties of glass such as color, scratch-resistance and the like can be imparted to glass by depositing upon the glass substances containing oxides of cobalt (Co), chromium (Cr), cerium (Ce), titanium (Ti), zirconium (Zr), aluminum (Al) and the like. Also, it is known that glass substrates having a thin metallic oxide coating firebonded to the surface thereof can conduct electricity at room temperature which renders the substrate advantageous for use in some electrical applications such as a substrate for integrated circuits.

The deposition of a metallic containing substance or compound upon the surface of a substrate, such as glass, to improve one or more properties of the substrate may be accomplished using several different methods or techniques. The available methods for depositing the metal containing substance or compound upon the substrate include silk screening, electroless deposition, electroplating, cathode sputtering, vacuum evaporation and vapor-phase deposition. Generally, the method selected to deposit the metal containing substance or compound upon the substrate depends on a number of factors including the desired uniformity of the deposit, the thickness of the deposit, the composition of the deposit, the availability of the equipment used to deposit the metallic containing substance or compound, the composition of the substrate to be worked and the like.

A potential drawback of the silk screen process and of the electroless process is the tendency of the deposit provided by each process to exhibit very little, if any, diffusion into the substrate. Without some diffusion of the deposit into the substrate, the bond joint at the interface between the deposit and the substrate may be tenuous thereby resulting in spalling and the like of the deposit.

The process of electroplating a substrate tends to be influenced by several factors including the temperature and the viscosity of the plating bath, the current, agitation of the bath, the concentration of the constituents of the bath, the pH of the bath and the like. It is seen that rather strict control of the parameters of the electroplating process may be required to achieve the desired deposit upon a substrate.

One of the drawbacks of cathode sputtering is that the process requires from minutes to hours to deposit a film upon the substrate whereas other techniques require seconds to minutes to deposit a film of comparable thickness upon the substrate. The vacuum evaporation process requires elaborate equipment to establish the necessary vacuum evaporation environment. In addition, neither cathode sputtering nor vacuum evaporation readily lend themselves to automated techniques.

Generally, the vapor-phase deposition method includes heating and reducing or decomposing a volatile metal halide and depositing the free metal upon the substrate. The thermally decomposable metal halide is capable of being divided into its component atoms by dissociation or reduction at a temperature below the melting point temperature of the metallic substance being deposited and below the melting point temperatue of the substrate. In addition, the volatile substance should be stable enough to reach the deposition surface before thermal decomposition takes place. Generally, a suitable gas such as hydrogen is passed over a liquid metal halide which is heated to a temperature necessary to provide the required partial pressure of the metal halide vapor. The gas mixture is passed over the heated substrate in a plating chamber where the metal halide is thermally decomposed to the free metal plus a halogen. The metal deposits on the substrate and the halide may be recovered by condensation techniques. The process has good flexibility and is more economical than several of the above-mentioned techniques; however, the method may not provide uniform deposits unless high gas flow rates are utilized.

The subsequent working or handling of some substrate materials, such as paper, depends to some extent on the moisture content of the substrate. The properties of paper, for example, for subsequent working and the like may be enhanced by depositing vapors of water upon the surface of a substrate material such as paper.

Generally speaking, the present invention relates to a vapor-phase type deposition method which overcomes several of the problems discussed above. More particularly, the method includes the step of vaporizing matter such as water or a suitable organometallic compound of Al, Ti or Zr and transporting the vaporized matter with a suitable gaseous carrier to an electrostatic charging device. The electrostatic charging device electrically charges the vapor of the matter. The charged vapor of the matter is directed toward, attracted to and deposited upon a surface of the substrate. Where the vapor is an organometallic compound, the deposited organometallic compound is caused to decompose and produce a metal containing deposit upon the surface of substrate upon which it is deposited. After the deposition of the vapors or in the case of organometallic compounds, decomposition of the organometallic compound vapors on the surface of the substrate, other substances may be applied, as desired, to the treated surface of the substrate. The other substances may be lubricants and the like.

It is, therefore, an object of the present invention to provide an apparatus for electrostatically charging and depositing charged vapors of matter upon a surface of a substrate. Another object of the present invention is to electrostatically charge organometallic compound vapors and deposit the charged vapors upon a heated surface of an amorphous substrate whereby the vapors decompose upon the surface of the substrate to produce a metal oxide containing deposit thereon. Further objects of the present invention will become apparent upon further review of the specification, the appended claims and the drawings.

Figure 2:
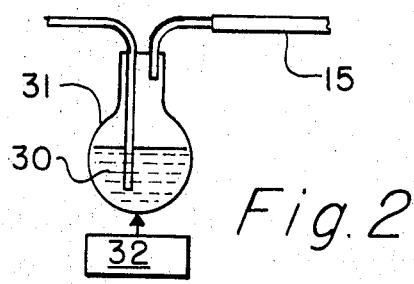

In the drawings:

FIG. 1 is a perspective view of an electrostatic device used to electrostatically charge organometallic compound vapors to be deposited upon a substrate; and FIG. 2 is a side view of a means for producing the organometallic compound vapors.

It is to be understood that the apparatus of the present invention is applicable to the deposition of vapors of matter other than vapors of an organometallic compound to a substrate other than glass. For example, the apparatus and the method may be used to deposit water vapor than a substrate such as paper. However, for the purpose of illustration and not for the purpose of limitation, the invention will be described using vapors of an organometallic compound as an example of a vapor of a specific matter and using glass as an example of a specific substrate material.

Referring now to FIG. 1 of the drawing, an apparatus for producing and electrostatically charging vapors of an organometallic compound and depositing such vapors upon a substrate 10 is indicated by reference numeral 11. The apparatus 11 includes means 12 for vaporizing an organometallic compound 13 and an electrostatic means 14, connected to vaporizing means 12 by a suitable conduit 15, for suitably distributing and electrostatically charging the vaporized organometallic compound.

The means 14 for electrostatically charging the vapors of the organometallic compound includes an elongated member 16 in spaced, substantially parallel relationship with surface 17 of the substrate 10 upon which the electrostatically charged vapors are to be deposited. The member 16 is preferably fabricated from a suitable, electrically conductive material that is substantially chemically inert with respect to the vapors of the organometallic compound. A support means 18, fabricated from a suitable electrically insulative material, is used to determinately space member 16 from surface 17 of the substrate.

The member 16 is suitably connected to the ungrounded terminal of direct current (D.C.) power supply 19. D.C. power supply 19 is capable of providing member 16 with a direct current voltage of up to 100,000 volts or higher. The member 16 presents to the surface 17 of the substrate 10 a relatively sharp or attenuated edge 20. An average potential gradient of about 8,000 volts per inch or higher, preferably about 20,000 volts per inch or higher, is maintained between the relatively sharp or attenuated edge 20 of the member 16 and the substrate 10. For example, if the attenuated edge 20 of member 16 is spaced 5 inches from surface 17 of the substrate 10 and the direct current source 19 provides 100,000 volts to the attenuated edge and the surface 17 is grounded, the average potential gradient between the edge 20 and the surface 17 of the substrate is about 20,000 volts per inch.

The substrate 17 is connected to ground by any suitable means. The grounding of the substrate 10 provides the substrate with an electrostatic spray attracting potential.

Since, during the operation of the apparatus 14, an average potential gradient of about 8,000 volts per inch or more exists between attenuated edge 20 of the member 16 and the grounded surface 17 of the substrate 17, an electrostatic field extends from edge 20 to the surface 17 of the substrate. Edge 20 of member 16 is one electrode and surface 17 of substrate 10 is another electrode in the electrostatic field between such edge and such surface. The electrostatic field assists in charging vapors of the organometallic compound and in depositing the charged vapors of the organometallic compound upon the surface 17 in a substantially uniform manner.

Vapors of the organometallic compound 13 are conveyed to the attenuated edge 20 of member 16 via conduit 15. The conduit 15 is fabricated from any suitable material which is chemically inert to the vapors of the organometallic compound 13 and which is substantially uneffected by the elevated temperature of the organometallic compound. A suitable resistance heating means 33 is connected to the conduit 15 to maintain the temperature within the conduit above a predetermined temperature. Resistance heating means 33 is energized by power supply 34. The resistance heating means 33 is electrically isolated from the potential or voltage of D.C. power supply 19.

A suitable resistance heating means 28 is located within the member 16 to maintain the temperature of the vapors of the organometallic material 13 above the boiling point temperature of the material. The resistance heating means 28 is connected to a suitable power supply 22. The resistance heating means 28 is electrically isolated from the potential or voltage of D.C. power supply 19.

The organometallic compound to be vaporized and electrostatically deposited upon surface 17 of the substrate 10 should have a boiling point or vaporization temperature somewhat below its decomposition temperature. For simplicity in the treatment of the surface of the substrate by the organometallic compound, the decomposition temperature of the vapors of the organometallic compound should be somewhat less than the melting point temperature of the substrate or in the case of a glass substrate, the decomposition temperature of the vapors of the organometallic compound should not exceed the softening point temperature of the glass. The softening point temperature of several commercially available glasses is about 500°C to about 1,500°C.

It is to be understood that the expression "softening point temperature" is the temperature or range of temperatures at which a particular glass softens prior to melting.

An organometallic compound whose vapors decompose upon or after contact with a heated surface in the temperature range of about 350°C to about 600°C to produce a metal oxide having a melting point temperature higher than the melting point temperature of the substrate is applicable to the present invention. However, it is to be understood that the compound should not undergo significant decomposition prior to contact with the heated surface of the substrate. Furthermore, a preferred metal containing deposit upon a glass substrate has a thermal coefficient of expansion similar to that of the glass to reduce the possibility of separation on cooling or temperature cycling of the substrate.

Volatile organometallic compounds of Al, Ti, Zr and the like which produce oxides of Al, Ti, and Zr, having melting point temperatures in excess of about 1,500°C, are satisfactory for the intended purpose of the instant invention. Examples of suitable organometallic compounds of aluminum are aluminum ethoxide and aluminum isopropoxide with aluminum isopropoxide being preferred. Aluminum isopropoxide vaporizes at a temperature of about 90°C. A suitable example of an organometallic compound of zirconium is tetra-t-butyl zirconate which vaporizes at a temperature of about 100°C. A suitable example of an organometallic compound of titanium is tetraisopropyl titanate which vaporizes at a temperature of 75°C. Of the several organometallic compounds of Al, Ti and Zr, organometallic compounds of Ti are preferred, with tetraisopropyl titanate being the most preferred organometallic compound of Ti.

The concentration of vapors of the organometallic compound in the mixture conveyed to member 16 does not appear to be important as far as the concepts of the present invention are concerned. However, a concentration corresponding to a partial pressure of at least 0.1 mm. Hg is desirable. Concentrations corresponding to partial pressures of about 0.1 to 50 mm. Hg are preferred. Higher concentrations, e.g., up to 100% can be used. The vapors can be diluted and transported to the electrostatic charging means by any carrier gas which does not chemically react with or cause decomposition of the vaporized organometallic compound. Suitable carrier gases are nitrogen, argon, methane, air and the like. Of the several named carrier gases, air is preferred since air functions as well as, for example, nitrogen and is readily available.

The carrier gas should be heated to a temperature which exceeds the boiling point or vaporization temperature of the organometallic compound to substantially prevent premature condensation of the organometallic compound. The temperature of the carrier gas should be less than the temperature required to decompose the organometallic compound to thereby substantially prevent decomposition prior to deposition upon a substrate.

The organometallic compound vapors of Al, Ti, and Zr, and in particlar organometallic compound vapors of Ti, tend to hydrolyze upon contact with water or water vapor. Therefore, water vapor or moisture should be excluded from the carrier gas. It is seen that deposition of the vapors of the organometallic compound is facilitated by using an environment which excludes as much water vapor or moisture as is practically possible.

The surface 17 of substrate 10 may be any material which is able to be raised to a temperature which will cause the deposited vapors of the organometallic compound to react therewith to produce metal oxide containing deposit thereon. The substrate may be a laminated body as long as the bond at the inface between adjacent laminae is not harmfully effected upon cooling of the laminated substrate from the elevated temperature.

One suitable substrate material is glass which can be heated to a temperature of about 350°C to about 600°C preferably about 450°C to about 600°C without experiencing harmful deformation. A suitable glass which may be used as a substrate are soda-lime or lime glass that include about 20 weight percent sodium oxide ($Na_2O$), about 5 weight percent calcium oxide (CaO), about 70 to about 75 weight percent silica ($SiO_2$) and small amounts of other compounds. Other suitable glasses which may be used as a substrate are silicate glass, silica glass, boro-silicate glass which includes up to about 5 weight percent boric oxide ($B_2O_3$), alumino-silicate glass, alabaster, solder glass, soda-zinc glass, potash-soda-lead glass, 96 weight percent silica glass and the like. Glass having a softening point temperature in the range of about 600°C to about 800°C is preferred for more advantageous bonding of the metal containing material appears to occur. Several glasses which have a softening point temperature between 600°C and 800°C are soda-lime (700°C), potash-soda-lead (625°C), borosilicate (750°C–780°C) and alabaster (670°C).

The substrate may be heated to a temperature of about 350°C or higher subsequent to the deposition of the electrostatically charged vapors of the organometallic compound thereon or, alternatively, the substrate may be heated to a temperature of about 350°C or higher prior to the deposition of the vapors of the organometallic compound thereon so that decomposition of the compound is initiated as the compound contacts the surface of the substrate. For example, glass produced by the Pilkington et al process described in U.S. Pat. No. 2,911,759 may be subjected to electrostatic deposition of the vapors of the organometallic compound while the glass is in the temperature range of 350°C to 600°C but prior to an initial cooling to a temperature below about 350°C.

Referring again to FIG. 1 of the drawing, an organometallic compound 13 from source reservoir 24 is introduced in droplet fashion into a suitable device such as tubular column 21 through inlet port 23. The interior of column 21 is maintained at a temperature above the boiling point or vaporization temperature of the organometallic compound by a suitable resistance heating means 22 positioned exteriorly of the column 21. The heating means 22 is suitably energized by power supply 35.

A suitable source 36 of a preheated carrier gas is used to provide a stream of substantially moisture free carrier gas such as air to the column 21 through inlet port 25 formed in the bottom of the column. The substantially moisture free carrier gas is preheated to a temperature above the boiling point temperature of the organometallic compound but below the decomposition temperature of the compound. The carrier gas mixes with the vapors of the organometallic compound providing a vapor-gas mixture. The organometallic compound vapor-gas mixture passes from the column 21 through the outlet port 26 to preheated conduit 15. The conduit 15 is heated to a temperature sufficient to substantially prevent condensation or decomposition of the vapor of the organometallic compound.

The organometallic compound vapor-gas mixture is emitted along edge 20 of member 16. The voltage maintained on device 14 produces a high electrical potential gradient at edge 20 thereof. The high electrical potential gradient creates an abundance of gas-ions. The gas ions, because they tend to be drawn toward the surface 17, bombard and charge the vapor particles emerging through the slot at edge 20. The vapor, therefore, is electrostatically charged by the electrostatic device 14. The electrostatically charged vapors of the organometallic compound are deposited upon the surface 17 of substrate 10.

The surface 17 of the substrate 10 may be heated to a temperature of about 350°C to about 600°C, alternatively, surface 17 subsequently may be heated to about 350°C to about 600°C to cause decomposition of the organometallic compound thereby producing a metal containing deposit on surface 17 of the substrate 10.

A suitable environmental chamber 27 circumscribes a conveyor (not shown) used to transport the substrate 10 beneath the electrostatic device 14. The chamber 27 reduces air drafts and excludes as much water vapor or moisture as is possible from the area where the vapors of the organometallic compound are deposited and decomposed upon the substrate.

Subsequent to the decomposition of the organometallic compound to produce a metal containing deposit upon surface 17 of the substrate, other suitable compositions may be applied to the surface 17. For example, substrate of ammonium and pilyoxyethylene, bees wax, hydrogenated animal oil and the like may be applied to surface 17 to assist in providing surface 17 with a more advantageous property or properties.

FIG. 2 shows yet another method which may be used to provide an organometallic compound vapor-gas mixture. The organometallic vapor stream is produced by bubbling a suitable carrier gas through a liquid 30 of the organometallic compound contained within reservoir 31. The liquid 30 of the organometallic compound is heated to a temperature above the vaporization temperature by suitable heat source 32. The carrier gas transports the organometallic compound vapors from reservoir 31 to the electrostatic charging device 14.

It is to be understood that mixtures of the vapors of several organometallic compounds are contemplated to be deposited using the method of the present invention.

The following examples are illustrative of the method for depositing electrostatically charged vapors of an organometallic compound upon a surface of a substrate.

EXAMPLE 1

Glass heated to a temperature of about 550°C is transported to chamber 27. A gaseous stream of preheated nitrogen and tetraisopropyl titanate is prepared using the apparatus of FIG. 1 by substantially saturating a stream of preheated nitrogen with tetraisopropyl titanate vapors. The tetraisopropyl titanate is vaporized at about 75°C. The mixture of tetraisopropyl titanate and nitrogen is diluted with about 8 volumes of 1 of additional nitrogen. The stream of nitrogen and tetraisopropyl titanate vapors is fed to the electrostatic device using the apparatus of FIG. 1. The edge 20 of the electrostatic device is placed about 8 inches above the grounded surface of the glass and charged with a DC voltage of about 100 to 160 kv. The conduit 15 and the electrostatic means 14 are heated to a temperature sufficient to prevent condensation and premature decomposition of the vapor.

Upon cooling of the glass, the glass possesses a deposit of an oxide of titanium.

EXAMPLE 2

The procedure of EXAMPLE 1 is followed during aluminum isopropoxide vaporized at 90°C. In this example the nitrogen-aluminum isopropoxide mixture is diluted with 19 volumes to 1 of additional nitrogen. The glass includes a deposit of an oxide of aluminum.

EXAMPLE 3

The procedure of EXAMPLE 2 is followed using as the organometallic compound tetra-t-butyl zirconate vaporized at 100°C. The nitrogen-t-butyl zirconate mixture is diluted to one twentieth with additional nitrogen. The glass has a deposit of an oxide of zirconium.

EXAMPLE 4

The procedure of EXAMPLE 1 is followed using dry preheated air in place of nitrogen, with subsantially the same results.

EXAMPLE 5

The procedure of EXAMPLE 1 is followed except that the temperature of the glass, when contacted with the nitrogen-tetraisopropyl titanate mixture is 350°C. The glass causes decomposition of the organometallic compound when heated subsequently to 550°C to thereby produce a deposit of an oxide of titanium.

The thickness of the metal oxide deposit upon the surface of the substrate depends upon, among other things, the length of time the surface of the substrate is subjected to the vapors of the organometallic compound, the vapor concentration of the organometallic compound in the carrier gas and the like. Therefore, contact times from a few seconds to 20 time or more may be necessary to obtain the desired thickness of the metal oxide containing deposit. Where a contact tim of a minute or more is contemplated, the chamber 27 may be enlarged to accommodate more than one electrostatic charging device 14. A deposit thickness in the range of about 0.005 to about 2 or more microns is contemplated by the present invention with a deposit thickness in the range of about 0.01 to about 1 micron being preferred.

It should be understood that the heating means 22, the power supply 34, the power supply 35, the resistance heating means 28, the resistance heating means 33, the resistance heating means 22 and any other electrical means associated with the apparatus 11 are electrically isolated from the potential or voltage of D.C. power supply 19. Also, it should be understood that column 21, reservoir 24 and source 36 are isolated from ground potential.

I claim:
1. An apparatus for depositing an organometallic material on a substrate comprising
a source of organometallic material,
means to form a vapor of the organometallic material including a member providing a chamber with a heater capable of maintaining the temperature within the member sufficient to vaporize the organometallic material but below the temperature at which it decomposes, and means to introduce the organometallic material into the member in droplet fashion;
means to electrostatically charge the organometallic vapor and to provide a depositing electrostatic field to the substrate including an elongated slotted member supported spaced from but parallel to the substrate to be coated and having an attenuated edge adjacent the slot and carrying a resistance heater electrically isolated from the member, said elongated slotted member being connected with a direct current power supply to charge the member to high voltage with respect to the substrate;
a heated conduit from the vaporizing means to the electrostatic depositing means;
an environment chamber substantially enclosing the electrostatic depositing means and the substrate adjacent thereto; and
means to supply a flow of dry preheated carrier gas to the vaporizing means to provide a continuous flow of vapor through the conduit to the slot of the electrostatic depositing means for continuous charging and deposition on the substrate.

* * * * *